United States Patent [19]
Ooki et al.

[11] Patent Number: 6,092,203
[45] Date of Patent: Jul. 18, 2000

[54] METHOD FOR ACCESSING INFORMATION

[75] Inventors: Masayoshi Ooki, Tokyo; Kouji Nishimoto, Narashino; Nobuyuki Hama, Ichikawa, all of Japan

[73] Assignee: Hitachi, Ltd., Tokyo, Japan

[21] Appl. No.: 09/160,287

[22] Filed: Sep. 25, 1998

Related U.S. Application Data

[63] Continuation of application No. 08/756,605, Nov. 26, 1996, Pat. No. 5,822,518.

[30] Foreign Application Priority Data

Nov. 29, 1995 [JP] Japan .................................. 7-310270

[51] Int. Cl.[7] .............................. G06F 12/00; G06F 12/14
[52] U.S. Cl. ............................ 713/201; 713/200; 713/202
[58] Field of Search ................................ 395/187.01, 186, 395/188.01, 200.03, 200.01; 380/21, 24, 4; 714/201, 200, 202; 707/10, 9

[56] References Cited

U.S. PATENT DOCUMENTS

| | | | |
|---|---|---|---|
| 4,995,112 | 2/1991 | Aoyama | 380/25 |
| 5,163,147 | 11/1992 | Orita | 707/9 |
| 5,239,648 | 8/1993 | Nukui | 707/10 |
| 5,263,158 | 11/1993 | Janis | 707/1 |
| 5,469,576 | 11/1995 | Daufrer | 395/186 |
| 5,481,720 | 1/1996 | Loucks et al. | 395/187.01 |
| 5,586,260 | 12/1996 | Hu | 395/187.01 |
| 5,604,490 | 2/1997 | Blakley et al. | 340/825.31 |
| 5,611,048 | 3/1997 | Jacobs | 395/188.01 |
| 5,664,098 | 9/1997 | Oianchi et al. | 395/186 |
| 5,822,518 | 10/1998 | Ooki et al. | 395/187.01 |

FOREIGN PATENT DOCUMENTS

| | | |
|---|---|---|
| 597592 | 5/1994 | European Pat. Off. . |
| 615196 | 9/1994 | European Pat. Off. . |
| 62-210556 | 9/1987 | Japan . |
| 2-181254 | 7/1990 | Japan . |
| 3-214348 | 9/1991 | Japan . |
| 4-251353 | 9/1992 | Japan . |
| 5-342161 | 12/1993 | Japan . |
| 7-200371 | 4/1995 | Japan . |

*Primary Examiner*—Ly V. Hua
*Attorney, Agent, or Firm*—Beall Law Offices

[57] ABSTRACT

An information accessing method permits the user data belonging to a client-server system to be accessed by a user belonging to another client-server system under proper security and controls the permission for accessing the user data according to the security ranks of the user whose data is to be accessed and the user who wants to access the data. When a client unit issues a request for accessing the user data of the user belonging to the other client-server system, the request for access is sent to an ID conversion unit through a user ID management unit. The ID conversion unit operates to convert a user ID into a guest ID by referring to an ID conversion table, and then sends the request for access to a user ID management unit. The user ID management unit makes sure that the guest ID is registered by referring to the user ID table. Then, the request for access is sent to the user data management unit through security check units, so that the whole or the open portion of the user data specified on the user data is allowed to be accessed.

8 Claims, 5 Drawing Sheets

FIG.2

440 ID CONVERSION TABLE

| USER ID | GUEST ID |
|---------|----------|
| A001 | B001 |
| A002 | B001 |
| A003 | B001 |
| A004 | B001 |
| A005 | B002 |
| A006 | B002 |

FIG.3

430 USER ID TABLE

| 431 USER ID | 432 SECURITY RANK | 433 ATTRIBUTE OF ANOTHER USER |
|-------------|-------------------|-------------------------------|
| C001 | A | BELONGING, POSITION AND THE LIKE OF USER |
| C002 | A | BELONGING, POSITION AND THE LIKE OF USER |
| C003 | B | BELONGING, POSITION AND THE LIKE OF USER |
| C004 | C | BELONGING, POSITION AND THE LIKE OF USER |
| C005 | C | BELONGING, POSITION AND THE LIKE OF USER |
| B001 | C | GUEST |
| B002 | D | GUEST |

FIG.4

420 SECURITY TABLE

| | A | B | C | D | E | F | ... | S | T | U | V | W | X | Y | Z |
|---|---|---|---|---|---|---|---|---|---|---|---|---|---|---|---|
| A | 1 | 0 | 0 | 0 | 0 | 0 | | 0 | 0 | 0 | 0 | 0 | 0 | 0 | 0 |
| B | 1 | 1 | 0 | 0 | 0 | 0 | | 0 | 0 | 0 | 0 | 0 | 0 | 0 | 0 |
| C | 1 | 1 | 1 | 0 | 0 | 0 | | 0 | 0 | 0 | 0 | 0 | 0 | 0 | 0 |
| D | 1 | 1 | 1 | 1 | 0 | 0 | | 0 | 0 | 0 | 0 | 0 | 0 | 0 | 0 |
| E | 1 | 1 | 1 | 1 | 1 | 0 | ... | 0 | 0 | 0 | 0 | 0 | 0 | 0 | 0 |
| F | 1 | 1 | 1 | 1 | 1 | 1 | | 0 | 0 | 0 | 0 | 0 | 0 | 0 | 0 |
| G | 1 | 1 | 1 | 1 | 1 | 1 | | 0 | 0 | 0 | 0 | 0 | 0 | 0 | 0 |
| H | 1 | 1 | 1 | 1 | 1 | 1 | | 0 | 0 | 0 | 0 | 0 | 0 | 0 | 0 |
| I | 1 | 1 | 1 | 1 | 1 | 1 | | 0 | 0 | 0 | 0 | 0 | 0 | 0 | 0 |
| J | 1 | 1 | 1 | 1 | 1 | 1 | | 0 | 0 | 0 | 0 | 0 | 0 | 0 | 0 |
| ... | ... | ... | ... | ... | ... | ... | ... | ... | ... | ... | ... | ... | ... | ... | ... |
| T | 1 | 1 | 1 | 1 | 1 | 1 | | 1 | 1 | 0 | 0 | 0 | 0 | 0 | 0 |
| U | 1 | 1 | 1 | 1 | 1 | 1 | | 1 | 1 | 1 | 0 | 0 | 0 | 0 | 0 |
| V | 1 | 1 | 1 | 1 | 1 | 1 | | 1 | 1 | 1 | 1 | 0 | 0 | 0 | 0 |
| W | 1 | 1 | 1 | 1 | 1 | 1 | ... | 1 | 1 | 1 | 1 | 1 | 0 | 0 | 0 |
| X | 1 | 1 | 1 | 1 | 1 | | | 1 | 1 | 1 | 1 | 1 | 1 | 0 | 0 |
| Y | 1 | 1 | 1 | 1 | 1 | 1 | | 1 | 1 | 1 | 1 | 1 | 1 | 1 | 0 |
| Z | 1 | 1 | 1 | 1 | 1 | 1 | | 1 | 1 | 1 | 1 | 1 | 1 | 1 | 1 |

410 USER DATA

| C001 | | | |
|---|---|---|---|
| OPEN PORTION | | CLOSED PORTION | |
| 7/7/95 | 10:30 TO 12:00 | ARRANGEMENT | DISTRIBUTION OF DATA ON THE DAY |
| 8/7/95 | 9:00 TO 10:00 | RECEPTION OF GUEST | IMPORTANT CUSTOMER |
| 8/7/95 | 14:30 TO 15:45 | TRAINING | PROGRAM DEVELOPMENT |
| 9/7/95 | 15:10 TO 17:00 | SYSTEM CHECK | SST |
| 10/7/95 | 20:30 TO 21:50 | WELCOME PARTY | PERSON IN CHARGE |

| C002 | | | |
|---|---|---|---|
| OPEN PORTION | | CLOSED PORTION | |
| 3/7/95 | 14:00 TO 16:00 | HALL ON 3F | INTRODUCTION OF PRODUCT |
| 4/7/95 | 13:00 TO 19:40 | SHOW ROOM | DEMONSTRATION | ARRANGED MANAGEMENT |
| 9/7/95 | 15:30 TO 15:45 | OWN SEAT | DRILL OF ANNOUNCEMENT | THREE SHIFT |
| 9/7/95 | 17:50 TO 21:00 | POOL | SWIMMING | CULTIVATION |
| 13/7/95 | 10:30 TO 13:50 | FIRST MEETING ROOM | PROMOTION FOR SALES | REFRESH |
| | | | | BRINGING BUSINESS RESULTS |

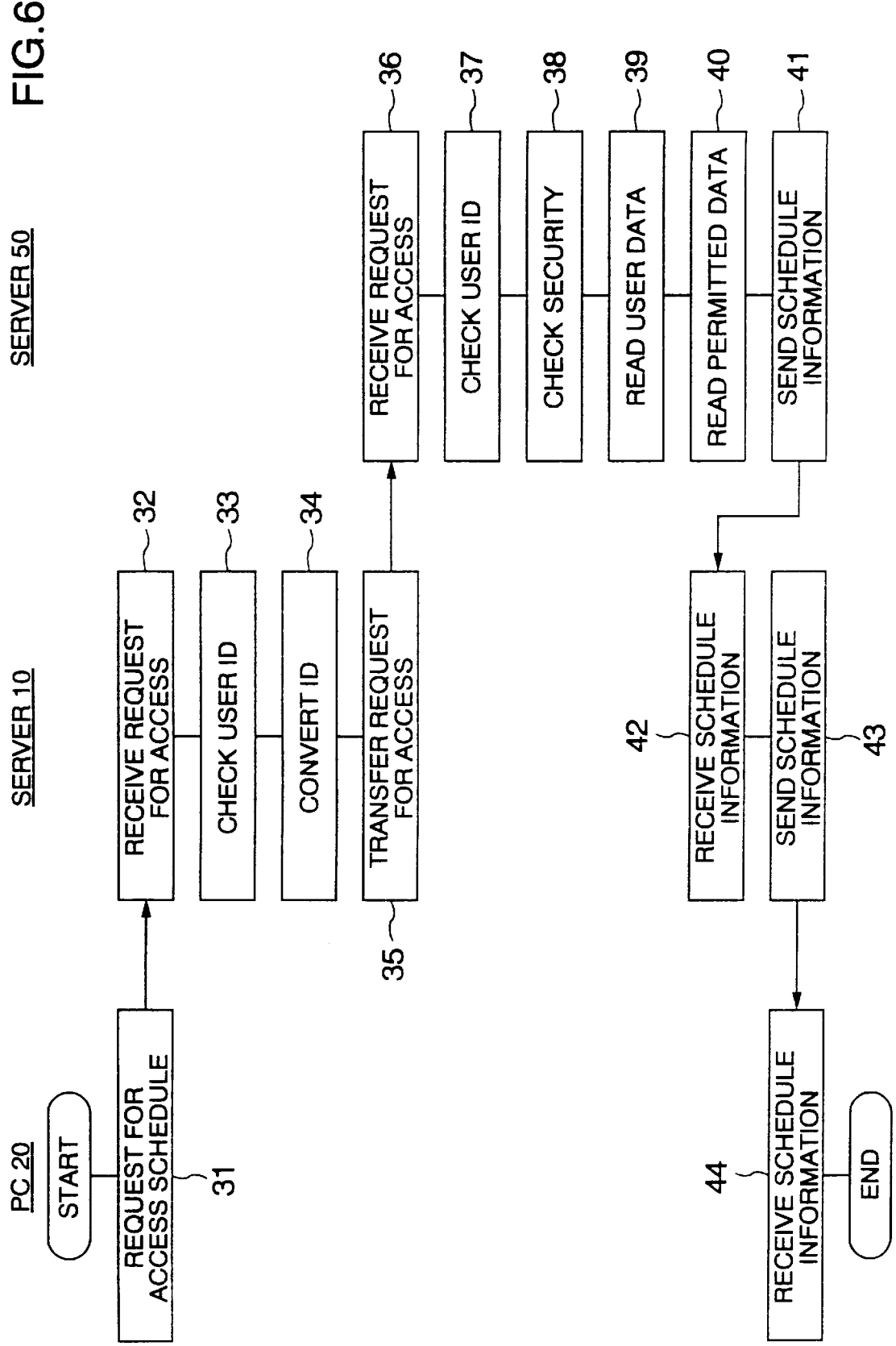

METHOD FOR ACCESSING INFORMATION

This is a continuation application of U.S. Ser. No. 08/756,605, filed Nov. 26, 1996, now U.S. Pat. No. 5,822,518.

BACKGROUND OF THE INVENTION

The present invention relates to an information accessing method for accessing information held in a server unit included in a client-server system, and more particularly to the information accessing method that is effective when a client unit located in a client-server system accesses information held in a server unit located in another client-server system through a network having two or more client-server systems connected therein.

As a method for accessing information held in a data file to be tightly secured, a method has been proposed for restricting access to such a data file with a user ID or a password. With this method, a client-server system takes the steps of registering in a server unit a user ID or a password with which access is permitted in a client-server system having the server unit, comparing a user ID or a password which the user inputs with the user ID or the password registered in the client-server system, and permitting access to a data file contained in the server unit only if both of the user ID and the password are matched to each other. If a user or a user group of specific users belonging to a section of a company makes access to a data file, some access levels are set according to the position of each user in the company. Each access level may reach the corresponding portion of the data file to be accessed. Those access levels are used for access restriction such as disability to access the data file, ability only to access a data file, and ability to update a data file.

When a data file registered in a client-server system is accessed by a client unit of another client-server system in a network such as a communication tool having two or more client-server systems connected therethrough, the client unit pre-registers a guide ID in the client-server system having the data file to be accessed so that the client unit may access the data file in the client-server system that is different from the system to which the client unit belongs.

SUMMARY OF THE INVENTION

If the foregoing client-server system is applied to a system for managing a schedule, the information to be secured is a schedule of each user.

For example, a person host who would hold a meeting, needs to access a schedule on the meeting day of each meeting participant for the purpose of checking if each participant's schedule is open. If, however, any one of the participants belongs to the management of a different client-server system from the system of the host, in the current state, the client-server system of the participant is configured to unconditionally permit the host to access his or her schedule or prohibit the host to do so.

The personal schedule contains one portion that is open to any user of the client-server system (such as appointed day and hours) and the another portion that is not open to all users of the system (such as a destination of a business trip or a dealer). The current system does not provide a capability of finely restricting the data to a portion to be accessed or to a portion that is not to be accessed according to the relation between the user to be accessed and the user who would access the data.

It is an object of the present invention to provide an information accessing method that permits a user of a client-server system to access the user data of another client-server system under proper security.

It is another object of the present invention to provide an information accessing method that controls permission to access the user data according to the corresponding relation of a security rank between a user whose data is to be accessed and a user who would access the user data.

As used herein, the term "system" means a system having a function of storing user data for each user, registering as a user ID an ID of a user permitted to access the user data and specifying the range of the registered user ID as the managing range of the system itself. The present invention is characterized to offer a security method that is arranged to convert a first user ID belonging to the managing range of a first system into a second user ID (guest ID) belonging to the managing range of a second system and permit the user to access the user data if the second user ID and a third user ID for an owner of the user data belong to the second system.

Further, the information accessing method according to the present invention is configured to set one of plural security ranks to each user, set a table for determining if the access to the user data is permitted from a security rank of a user for requesting the access to the user data and a security rank of a user whose data is accessed by the former user, and determine if the access to the user data is permitted by referencing this table if requested to access the user data.

When the user with the first user ID logs in the first system or issues a request for access to the user data, the first user ID is checked by the first system. When the user with the first user ID issues a request for accessing the user data of a second system, it is checked if the first user ID is registered in the ID conversion table. When the request for access is passed to the second system, it is checked if a second user ID is registered in the ID conversion table. That is, three checks are executed until the user of one system is permitted to access the data of the user belonging to the other system. After these checks are done, the user with the first ID enables to access the whole user data managed by the second system. Further, the use of the security rank makes it possible to determine if the access to at least part of the user data is permitted on the basis of the security rank of the user for issuing a request for access and the security rank of the user whose data is to be accessed.

BRIEF DESCRIPTION OF THE DRAWINGS

FIG. 2 is a table showing a data format of an ID conversion table 14 according to an embodiment of the present invention;

FIG. 3 is a table showing a data format of a user ID table 11 according to an embodiment of the present invention;

FIG. 4 is a table showing a data format of a security table 12 according to an embodiment of the present invention;

FIG. 5 is a table showing a data format of user data 13 according to an embodiment of the present invention; and FIG. 6 is a flowchart showing a flow of process located between the systems according to an embodiment of the present invention.

DESCRIPTION OF THE PREFERRED EMBODIMENT

Figure 1:
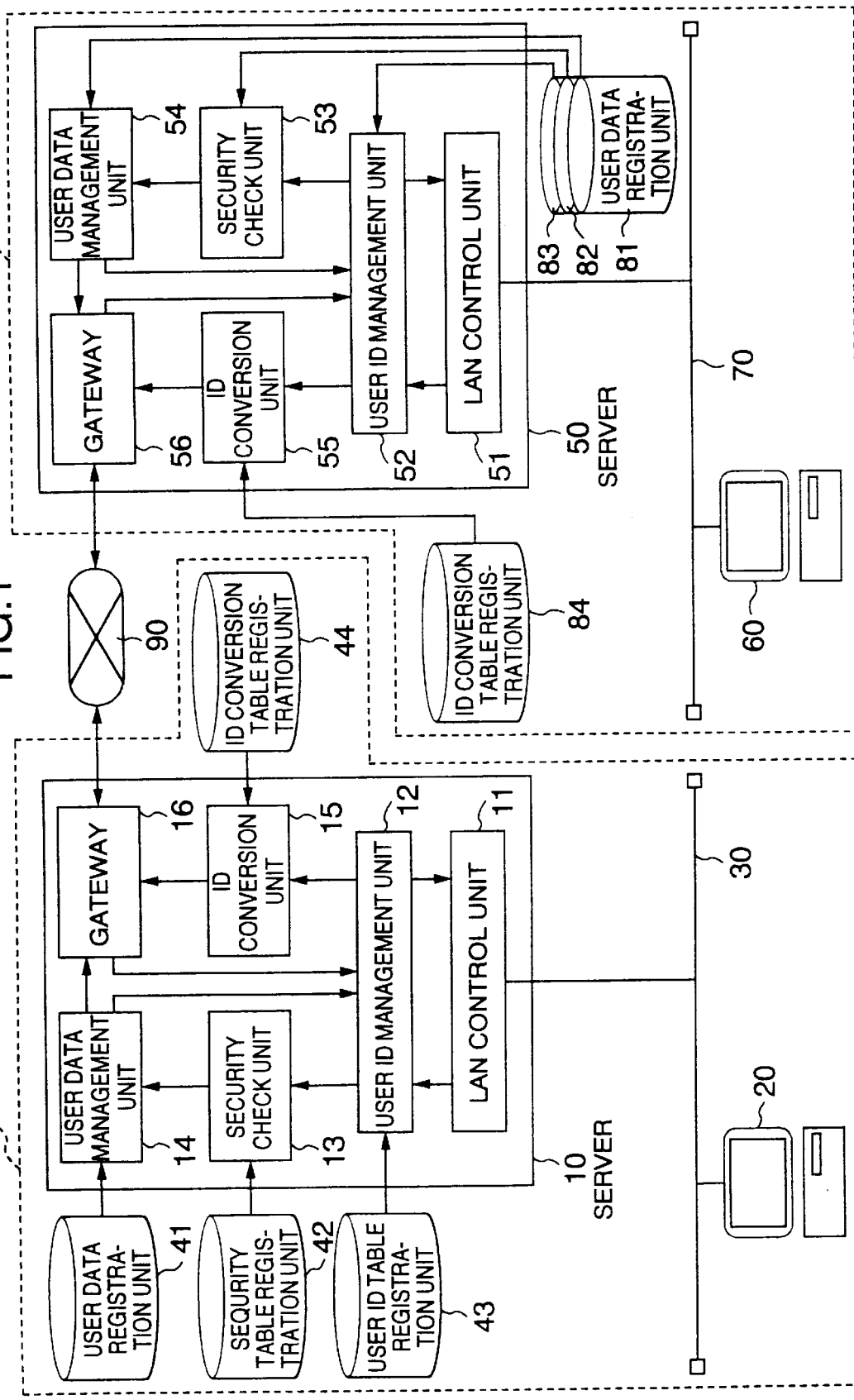
FIG. 1 is a block diagram showing an overall configuration of a system according to the present invention.

The following description will be oriented to a schedule management to which an embodiment of the present invention is applied with reference to the drawings.

FIG. 1 is a block diagram showing a basic system arrangement for describing an embodiment of the present invention. In the present invention, the term "client-server system" means a system configured to connect at least one client unit (20) to at least one server unit (10) so that the server unit of this system manages data (41) of the user who uses the client unit of this system.

FIG. 1 shows a system configuration having two such client-server systems (100, 500) connected through a network 90. A numeral 10 denotes a server unit for managing a schedule of a user. A numeral 20 denotes a personal computer (PC) that is a client unit for accessing the server unit 1 through a local area network 30 (LAN). In FIG. 1, one PC 20 is connected to the LAN 30. In practice, two or more PCs may be connected to the LAN 30. A numeral 41 denotes a user data registration unit for registering a schedule of each user. The schedule registered in the registration unit 41 comprises an open portion 411 and a closed portion 412, both of which are shown in FIG. 5 and will be discussed below. A numeral 43 denotes a user ID table registration unit for registering a user ID that is permitted to access the user data held in the client-server system to which the user with the user ID belongs. A numeral 42 denotes a security table registration unit for registering a security table for determining if the closed portion 412 of the schedule of the target user is to be accessed according to the security ranks of the user who would like to access the data and the user to be accessed, which will be discussed in detail with reference to FIGS. 3 and 4.

A numeral 44 denotes an ID conversion table registration unit for registering an ID conversion table for registering the corresponding relation between the user ID and the guest ID (which belongs to another schedule managing system). A numeral 11 denotes a LAN control unit for controlling communication between the server 10 and the PC 20 through the LAN 30.

A numeral 90 denotes a network such as a public line, a private line, or a trunk LAN connected to two schedule management systems (100, 500). A numeral 16 denotes a gateway for controlling communication between the two schedule management systems through the network 90. A numeral 12 denotes a user ID management unit that is operated to reference the user ID table registration unit 43 for checking the user ID sent from the PC 20 and the guest ID sent from the other schedule management system and to obtain an address of the PC from the user ID. A numeral 13 denotes a security check unit that determines if the access to the closed portion 412 of the schedule of the target user is permitted by referring to the security table registration unit 42. A numeral 14 denotes a user data management unit that is operated to read schedule information of the user requested by the PCs (20, 60) and send the data permitted as a result of the determination of the security check unit 13 to the PC 20 or the other system 500 through the user ID management unit 12 or the gateway 16. A numeral 15 denotes an ID conversion unit for converting the user ID into the guest ID by referring to the ID conversion table 44 in the ID conversion table registration unit.

In FIG. 1, the network 90 is served to connect the schedule management system (100) shown in the left hand side of the figure with the other schedule management system (500) shown in the right hand side of the figure, each of which has the same functional configuration as the other. The server unit 10 is an information processing apparatus such as a PC or a workstation. The user ID management unit 12, the security check unit 13, the user data management unit 14, the ID conversion unit 15 and the like are realized by executing a program stored in a storage unit (not shown) of this information processing apparatus.

FIG. 2 shows an example of a data format of the ID conversion table 440 that resides in the ID conversion table registration unit 44 (or 84). The ID conversion table has a corresponding relation set between the user ID and the guest ID. The user ID is a user identifier registered in the user ID table registration unit 43 included in the client-server system (for example, 100) to which the user belongs. The guest ID is a user identifier registered as a user ID in the user ID table registration unit 84 included in the other client-server system (for example, 500). If one client-server system includes as a participant a user permitted to access the other client-server system, the guest ID is registered as a guest ID in the ID conversion table included in the latter client-server system. If one client-server system does not include the user permitted to access the other client-server system, the guest ID is not registered in the ID conversion table of the latter system. The guest ID may be used in duplicate. Hence, two or more users may use one guest ID.

FIG. 3 shows an example of a data format of the user ID table 430 registered in the user ID table registration unit 43. This table is used for registering the user(s) permitted to access the user data registration unit 41. The table contains the identifiers of the users belonging to the managing range of the schedule management system. Each entry is composed of a user ID 431, a security rank 432 and attribute information 433 of a user. The security rank 432 indicates a rank or a level of the security. In this example, the entry having the user ID 431 of "B001" and "B002" indicates the registration of the guest ID as the user ID.

FIG. 4 shows an example of a data format of the security table 420 registered in the security table registration unit 42. The security table 420 indicates an access right to the closed portion of the schedule for each security rank 432. An alphabet on an abscissa axis indicates a security rank of a user whose data is to be accessed, while an alphabet on an ordinate axis indicates a security rank of a user who wants to access the user data. In the access right, a value of "1" indicates access enabled, while a value of "0" indicates access disabled. In this table, assuming that the top rank is A and the rank goes down one by one from A to Z, this table is an example of a common security management, in which if (the security rank of the user who wants to access the data)≧(the security rank of the user whose data is to be accessed), the user who wants to access the data is always permitted to access the data, while if not, he or she is not permitted to access the data. In practice, this data format does not need the table, because the access right can be obtained by comparing the security rank of both of the users with each other. However, if the access right is obtained from the security ranks of the user who wants to access the data and the whose data is user to be accessed in a complicated manner, the security table 420 is necessary.

FIG. 5 shows an example of a data format of the user data 410. The user data 410 stores the schedules of the users as the user data of two or more users. The user ID 431 is an ID number indicating an owner of the user data to be accessed. In the schedule information of each user, the open portion 411 is a portion to be accessed by any user irrespective of the access right. Concretely, the open portion 411 corresponds to a day and a time portion of the schedule. In particular, the open portion 411 indicates to any user only a free time on the schedule of the user to be accessed. The closed portion 412 indicates the data that is accessible only to the user who has an access right, and contains private information or information about a trade secret such as a destination of a business trip or an important matter of business.

Herein, the description will be oriented to the actual procedure for accessing the schedule data.

At first, the description will be oriented to the procedure about how the user of the PC 20 that serves as a client unit of the client-server system 100 makes access to a schedule of the user registered in the system 100 itself.

The user of the PC 20 (User ID: C003) issues a request for accessing the schedule data included in his or her own system to the LAN control unit 11 of the server unit 10 through the LAN 30 by transmitting the data for specifying his or her own user ID and that of the user whose schedule data is to be accessed (such as an employee number, a name or a user ID). The user ID management unit 12 is operated to check if the received user ID is the data of the user managed by the client-server system to which the management unit 12 belongs by referring to the user ID management unit 12. In this case, the user ID indicates a user registered in that client-server system. Hence, the security rank (B) for the user ID is read from the server unit, and the data for specifying the ID of the user who wants to access the data, the corresponding security rank and the user whose data is to be accessed are passed to the security check unit 13. Then, the security check unit 13 operates to determine if the access to the closed portion 412 of the requested schedule is permitted by referring to the security table unit 42, and then passes the determined result to the user data registration unit 14. The user data management unit 14 operates to access the user data registration unit 41 for reading the schedule data requested to be accessed and for transmitting the permitted portion to the PC 20 through the user ID management unit 12, the LAN control unit 11, and the LAN 30.

In turn, the description will be oriented to the procedure about how a user of one schedule management system issues a request for access to a user of the other schedule management system.

FIG. 6 shows this procedure and a flow of process from when the PC (20) issues a request for accessing a schedule of another user to when the PC (20) obtains the requested schedule information. The PC (20) operates to issue to a server unit (10) a request for accessing a schedule with a user ID for issuing a request and the other user ID to be accessed of the other system (step 31). The user ID management unit 12 receives this request through the LAN 30 and the LAN control unit 11 (step 32), and stores the correspondence between the requested user ID and the physical address of the PC 20. Next, the user ID management unit 12 operates to check the ID of the user for giving an accessing request by referring to the user ID table 43 (step 33), and then passes the control to the ID conversion unit 15 if the user whose data is to be accessed belongs to a different system from the system of the user who wants to access the data. The ID conversion unit 15 operates to convert the user ID into the guest ID by referring to the ID conversion table (440) (step 34), and transfers a request for access to the server unit 50 of the different client-server system 500 through the gateway 16 and the network 90 (step 35). If the user ID is not registered in the ID registration table 440, the ID conversion unit 15 rejects the request for access. The request for access contains a guest ID, a user ID and a user ID of a user whose data is to be accessed. The user ID management unit 52 of the server unit 50 receives the request for access (step 36) and checks if the guest ID and the user ID 431 of the user whose data is to be accessed are registered in a user ID table registration unit 83 (step 37). If both of the IDs are not registered in the unit 83, the user ID management unit 52 rejects the request for access through the gateway 56. If both of the IDs are registered in the registration unit 83, the user ID of the user for giving a request for access, its security Lank 432, the user ID of the user whose data is to be accessed, and its security rank 432 are passed to the security check unit 53. The security check unit 53 operates to obtain an access right for the user for giving a request for access by referring to the security table 82 (step 38), and passes the user ID of the user for giving a request for access, the user ID of the user whose data is to be accessed and the access right to the user data management unit 54. The user data management unit 54 operates to retrieve the data stored in the user data registration unit 81, and reads the user data registered under the user ID 431 of the user to be accessed (step 39). If the access right is enabled, the overall schedule information is transferred to the server unit 10 through the gateway 56 and the network 90, while if the access right is disabled, only the open portion 411 of the schedule information is transferred to the server unit 10 (steps 40 and 41). This schedule information contains the user IDs of the user for giving an access request and the user whose data is to be accessed. The user ID management unit 12 receives this schedule information (step 42) and obtains a physical address of the PC 20 from the user ID of the user for giving an access request and transmits the schedule information to the PC 20 which issues an access request through the LAN control unit 11 and the LAN 30 (step 43). The PC 20 receives this schedule information (step 44) and displays it on the display unit.

In the foregoing embodiment, when the PC (20) makes access to the server unit, the user ID of the requester is sent with the information for specifying the user whose data is to be accessed (such as an employee number, a name and a user ID). Instead, the user ID of the requester may be sent alone to the server unit. Then, the state of the client-server system permitted to be accessed by the user ID is checked (Concretely, the indexes such as a name and an employee number about the user data permitted to be accessed are output to the client unit.) Next, the information for specifying the user whose data is to be accessed may be input to the server unit.

Further, in the foregoing embodiment, the gateway (16, 56) is provided inside of the server unit (10, 50). Instead, the gateway (16, 56) may be located independently of the server unit (10, 50). In place of the gateway (16, 56), another inter-network connecting unit such as a router may be selected according to the type of the network 90. Or, a simple communication control mechanism of the network may be utilized.

Moreover, in the foregoing embodiment, the user ID of the requester is transferred from the server unit 10 to the server unit 50 and then returns to the server unit 10. This is an ID for taking correspondence with the PC 20. However the user ID may be replaced with a transaction ID numbered by the user ID management unit 12.

The content of the user data 431 is not limited to the information about the schedule of the user. It may be any data. The user data 431 is divided into the open portion 411 and the closed portion 412. In practice, all of the user data 431 may be the open portion. In this case, the security rank 432, the security table 420 and the security check unit 13 are not necessary. On the contrary, all of the user data may be the closed portion.

In the foregoing embodiment, one schedule management system is configured of just one server unit. Instead, the invention may employ a multi-server system and therefore be configured of two or more server units. The schedule management system configured as described above has two or more server units connected through one LAN, one of which server units has a gateway and the others of which server units do not have gateways. The content of the user ID table 430 is the same in any server unit included in the system. Each server unit takes the responsibility of the corresponding user group. The flow of process of the multi-server type schedule management system is the same as the flow of process shown in FIG. 6 from the steps 31 to 36. At a step 37, it is checked if the guest ID and the user ID 431 of the user whose data is to be accessed are registered by referring to the user ID table 430. If both of the IDs are registered, it is determined if the user ID of the user to be accessed belongs to the user group to be processed by the server unit. If the request for accessing the schedule may be processed by the server unit, the flow of process from the subsequent steps 38 to 44 is the same as the flow of process shown in FIG. 6. If the user ID of the user to be accessed belongs to a user group to be processed by another server unit included in the same information management system, the user ID and its security rank are sent to that server through the LAN control unit and the LAN. Then, this server is operated to perform the process from the steps 38 to 40, and then sends the schedule information to the server. The server unit operates to just relay the schedule information and then send it to the server unit through the gateway. The flow of process from the subsequent steps 42 to 44 is the same as the flow of process shown in FIG. 6. As mentioned above, the multi-server type information management system enables to distribute the user data 410 and the processing load to two or more server units.

As set forth above, according to the present invention, the user who passes the checking gates of the user ID and the guest ID can make access to all the user data belonging to the other system. Further, the system provides a capability of fine controlling the access right to the closed portion of the user data according to the security ranks of the user whose data is to be accessed and the user for giving an access request.

What is claimed is:

1. An information processing apparatus comprising:

inputting means for inputting a user ID in a first client-server system;

sending means for sending said user ID to a conversion unit coupled to a second system, which the conversion unit converts said user ID into a guest ID corresponding to security level used in said second system, and wherein said guest ID corresponds to said user ID; and receiving means for receiving data sent from said second system.

2. The information processing apparatus as claimed in claim 1, wherein said sending means is arranged to send said user ID to said conversion unit over a network that includes a LAN.

3. An information processing apparatus as claimed in claim 2, wherein the inputting means and the sending means are provided in a client of the first client-server system, and wherein the conversion means is provided in a server of the first client-server system.

4. An information processing apparatus as claimed in claim 1, wherein the conversion unit is provided in the first client-server system.

5. An information processing apparatus comprising:

inputting means for inputting a user ID in a first client-server system;

conversion means which converts said user ID into a guest ID corresponding to a security level used in a second system different from said first client-server system, wherein said guest ID corresponds to said user ID;

sending means arranged for sending said guest ID to a network coupling said second system to said first client server system; and receiving means for receiving data sent from said second client-server system.

6. The information processing apparatus as claimed in claim 5, wherein said sending means is arranged to send said user ID to said conversion unit over a network that includes a LAN.

7. An information processing apparatus as claimed in claim 5, wherein the conversion means is provided in the first client-server system.

8. An information processing apparatus as claimed in claim 5, wherein the inputting means is provided in the client of the first client-server system, and wherein the conversion means is provided in a server of the first client-server system.

* * * * *